United States Patent Office 3,183,705
Patented May 18, 1965

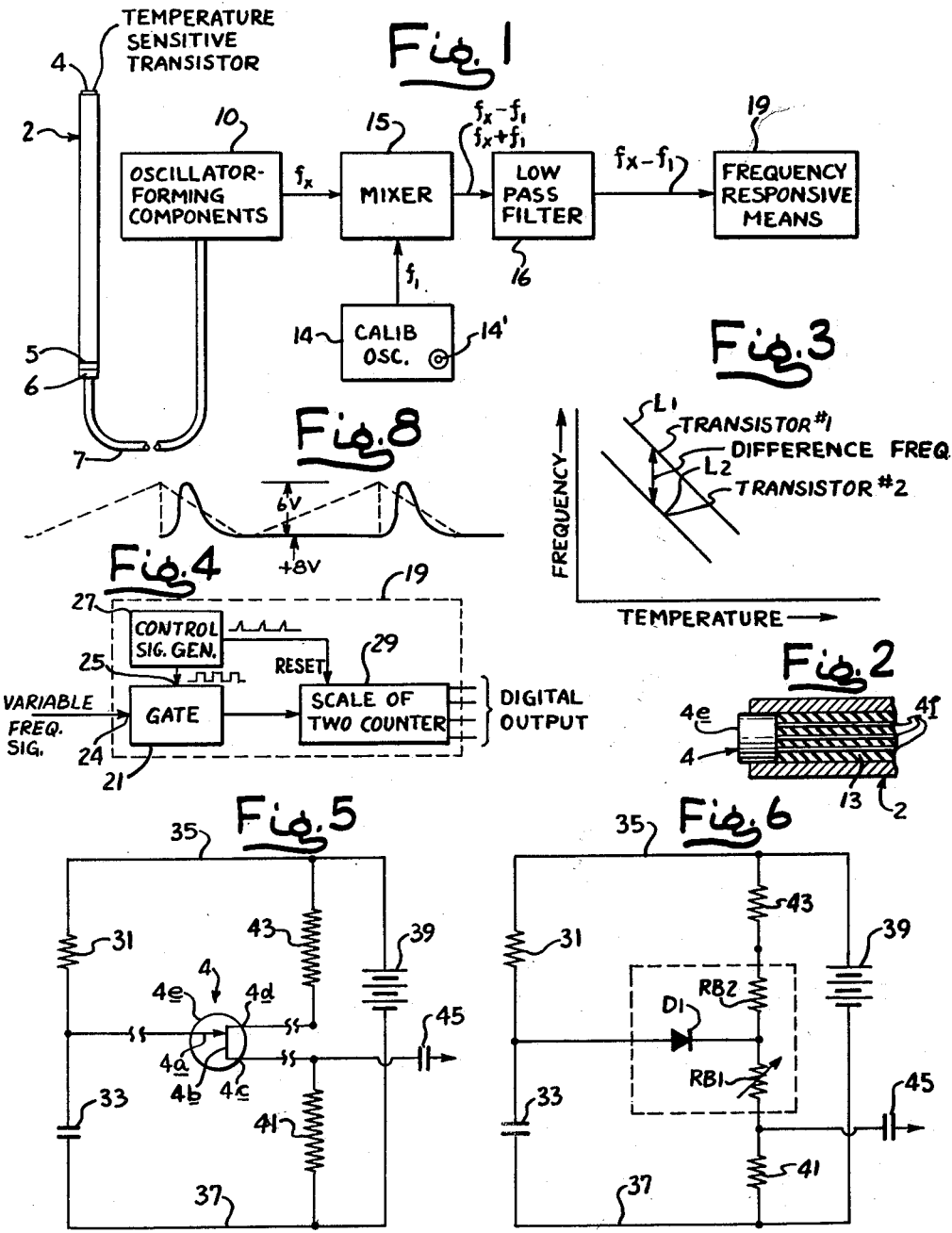

3,183,705
TEMPERATURE OR PRESSURE MEASURING APPARATUS
Walter Welkowitz, Nixon, N.J., assignor to Gulton Industries, Inc., Metuchen, N.J., a corporation of New Jersey
Filed July 6, 1961, Ser. No. 122,305
1 Claim. (Cl. 73—1)

The present invention relates primarily to temperature measuring apparatus, particularly temperature measuring apparatus capable of converting temperature variables directly to digital electrical signals. (The term "digital signal" is meant to encompass time or frequency modulated signals or the like where the amplitude of the signals do not convey any useful information.) However, certain aspects thereof have a broader application such as the measurement of pressure.

Heretofore, temperature measuring apparatus commonly converted temperature variables first to an electrical analog signal and then to a digital signal. The step of conversion of an analog signal to a digital signal with any degree of accuracy normally requires expensive and complicated equipment. Accordingly, one of the objects of the present invention is to provide temperature measuring apparatus which converts a temperature variable directly to a digital signal. A related object of the invention is to provide temperature measuring apparatus as just described which is sensitive, accurate and easy to build and maintain.

In accordance with the most preferred form of the present invention, advantage is taken of the normally undesired variation of transistor characteristics with temperature by utilizing the transistor as a frequency-determining element in an oscillator circuit. The transistor is most advantageously mounted in a probe where it is subjected to the temperature environment involved, the probe being connected to the other oscillator-forming elements by a suitable cable or the like. The unijunction transistor has been found especially useful as the oscillator transistor because of its marked sensitivity to temperature variations and its highly stable negative resistance characteristic which makes it applicable to oscillator circuits. One difficulty with the use of unijunction transistors as frequency-determining elements in oscillator circuits is the fact that manufacturers have not yet been able to manufacture them with uniform characteristics. For example, the interbase resistance of a unijunction transistor manufactured by a single manufacturer varies as much as 20%. Consequently, two substantially identical pieces of equipment could produce marked differences in frequency output at a given temperature and each would have a different calibration scale. This would unduly complicate the testing and calibration procedures in the manufacturing of such equipment.

It is, accordingly, another one of the objects of the present invention to provide a circuit for measuring the temperature of a given environment through the use of a variable frequency oscillator circuit where the frequency determining element in the oscillator circuit is a transistor or the like whose characteristics vary with temperature, and, further, wherein consistent results can be achieved despite normal differences in the characteristics of the transistors.

In accordance with the present invention, it has been discovered that the temperature-frequency curves for transistors of a given type placed in a given oscillator circuit have a fairly consistent slope over a range of temperatures. The calibration problem referred to is overcome by adding to the oscillator circuit a variable frequency calibration oscillator and a mixer circuit to which the outputs of the variable frequency calibration oscillator and the main temperature responsive oscillator are fed. The mixer circuit produces sum and difference beat frequency components in the output thereof. A filter is connected to the output of the mixer circuit which filters out all but the difference beat frequency components. Calibration is effected by adjusting the calibration oscillator to a frequency which produces a zero beat frequency in the output of the filter circuit when the transistor is placed in a reference temperature. The calibration oscillator must, of course, have a range of operation to match the range of frequency variation of the temperature responsive oscillator circuit due to variation in transistor characteristics. The reference temperature is preferably selected to be at or beyond one of the limits of the temperature range to which the equipment will be subjected so that a given beat frequency can be produced by only one frequency in the range. Since the slope of the temperature-frequency curve of the temperature-responsive oscillator circuit is fairly constant over a given temperature range, one calibration scale will suffice despite variations in the transistor once the zero beat frequency adjustment at a single reference temperature is made. In effect, the variation in frequency with the transistor used is cancelled out by the zero beat frequency adjustment. Thus, the calibration oscillator, mixer and filter circuit are permanent elements in the equipment since the difference beat frequency is here the measure of the temperature sensed by the transistor.

Although the present invention appears to have its greatest utility in temperature measurement, it is also applicable to pressure measurement since the transistor is also a pressure-responsive element.

The features of the present invention will be best understood by making reference to the specification to follow, the claim and the drawings wherein:

FIG. 1 is a simplified box diagram illustrating the basic components of an exemplary temperature measuring system of the present invention;

FIG. 2 is a fragmentary sectional view through the end of the transistor-carrying probe forming one of the components in FIG. 1;

FIG. 3 is a diagram illustrating the variation in the temperature-frequency curves of an oscillator circuit operated with different transistors of the same type;

FIG. 4 is a more detailed box diagram of a portion of the measuring system of FIG. 1;

FIG. 5 is a schematic diagram of a unijunction transistor relaxation oscillator circuit preferably used in the measuring system of FIG. 1;

FIG. 6 is a circuit diagram similar to FIG. 5 wherein the unijunction transistor has been replaced by an equivalent diode and resistor network;

FIG. 7 shows waveforms C1, C2, and C3 of the voltage across the capacitor of the circuit of FIG. 5 for three different pressure or temperature conditions; and FIG. 8 is the waveform of the voltage across the output load resistor of the circuit of FIG. 5.

Refer now to the simplified box diagram of FIG. 1 which illustrates the basic components of an exemplary form of the present invention. These components include a hollow cylindrical probe 2 in which is hermetically sealed a transistor 4 which is preferably (although not necessarily) a unijunction transistor. The various terminals of the transistor extend to a socket connector 5 at the inner end of a probe which connects with a plug connector 6 of a cable 7 extending to oscillar-forming components 10 forming an oscillation circuit with the transistor 4. The transistor 4 constitutes an integral part of the oscillator circuit and the temperature (and/or pressure) characteristics thereof determine the frequency thereof in a manner to be explained.

The unijunction transistor is preferred because it is the most temperature sensitive type of transistor presently available. It is a three terminal device which includes a control or emitter electrode $4a$ extending into a N-type silicon bar $4b$ forming a base electrode. Separate electrical connections are made to the opposite ends of the bar by conductors $4c$ and $4d$. The emitter electrode contacts the bar $4d$ closer to one end and the end of the conductor which connects with the end of the bar furthest from the emitter electrode is referred to as base terminal #1 (i.e. conductor $4c$) and the end of the other conductor $4d$ is referred to as base terminal #2.

The elements making up the transistor unit are normally enclosed in a metal shell or casing $4e$ which forms an air and pressure tight enclosure isolating all of the external environmental conditions except temperature from the transistor unit. The casing $4e$ is sealed to the internal walls of the probe 2 by a suitable cement and projects a small distance beyond one end of the probe (FIG. 2). Various leads $4f$ extend to the emitter and base terminals of the transistor and are maintained in spaced insulated relationship within the probe by embedding the same in a suitable resin 13 filling the space within the probe 2. The leads $4e$ extend to the aforesaid socket connector 5 at the inner end of the probe 2. The resin 13, connectors 5 and 6 and cable 7 isolate the conductors which they surround from the moisture of the environment to be measured.

If it is desired that the transistor 4 be responsive to pressure, the rigid casing $4e$ would be replaced by a suitable resilient body of material (not shown) in which the transistor-forming elements are embedded, so that pressure variations in the environment to be measured are transmitted to the transistor elements.

As previously indicated, one of the problems overcome by the present invention is due to the difficulty in manufacturing transistors, particularly unijunction transistors, with consistent characteristics, such as interbase resistance, etc. These variations in characteristics produce differences in the temperature-frequency curves of the oscillator circuit including the transistor 4. This is illustrated in FIG. 3 where the line L1 indicates the temperature-frequency curve when the oscillator circuit is used with a given unijunction transistor 4 and the line L2 indicates the temperature-frequency curve characteristic for the same circuit with a different unijunction transistor of the same type. It should be noted that the sensitivity or slope of the lines L1 and L2 are fairly constant so that a constant frequency difference occurs for the various temperatures indicated.

In accordance with the present invention, this constant frequency difference is effectively eliminated by the addition of a variable frequency calibration oscillator 14 having a manual control knob $14'$ for varying the frequency output thereof over a range which includes the variation in frequency of the output of the temperature (or pressure) responsive oscillator circuit formed by the components 10 and the transistor 4 for a given reference temperature (or pressure). The output of the latter oscillator circuit and the calibration oscillator 14 are fed to the respective inputs of a conventional mixer circuit 15 which may be a mixer circuit of the type commonly found in radio receivers. The mixer circuit 15 produces sum and difference beat frequency components in the output thereof. A filter circuit 16 is coupled to the output of the mixer circuit 15 for filtering out the sum beat frequency component leaving the output thereof the difference beat frequency component. The output of the filter circuit is fed to a frequency responsive means 19 which may take a number of forms. In the present form of the invention, it should be capable of indicating the presence of an input signal at zero frequency. If this is not possible, then earphones or the like may be coupled to the output of the low pass filter 16 audibly to indicate a zero beat frequency.

The manual control knob $14'$ is adjusted to provide a zero difference beat frequency when the transistor 4 is placed in a standard temperature (or pressure) environment which, as above indicated, is preferably at or beyond one of the limits of the range of temperatures (or pressures) to which the equipment will be subjected. There will then be no ambiguity in the measurement results because only one temperature or pressure will produce a given difference beat frequency component.

The frequency responsive unit 19 may comprise the components shown in FIG. 5. As there shown, it includes a gate circuit 21 of more or less conventional form having a first input 24 to which the variable frequency signals to be measured are fed. The gate has a second input 25 to which a gate signal in the form of a square wave signal is fed from a control signal generator 27. The square wave signal may comprise alternating positive and negative going portions, the positive or negative going portions thereof opening the gate 21 for fixed intervals. When the gate is opened, the variable frequency signals are fed to the input of a pulse counting circuit 29 which may be scale-of-two counter of conventional form or other suitable pulse counter. The control signal generator 27 also feeds pulses to the scale-of-two counter 29 between the successive pairs of gate opening pulsations from the control signal generator 27. The gate circuit 21 is thus opened periodically for fixed time intervals, the number of pulses which pass through the counter 29 during each such interval being a measure of the temperature sensed by the transistor 4. The output conditions of the various stages making up the scale-of-two counter 29 as the gate circuit 21 is closed indicates in binary digital form the temperature involved.

The calibration oscillator 14 may be any one of a number of well known oscillator circuits, the details of which need not be described. However, since the design of the temperature or pressure responsive oscillator circuit is unconventional, a description of a preferred form thereof will now be described. This oscillator circuit is shown in FIG. 5 using a unijunction transistor. As illustrated therein the emitter electrode terminal of the transistor is connected to the juncture of a resistor 31 and a capacitor 33. The remote ends of the resistor and capacitor are connected by lines 35 and 37 respectively, to the positive and negative terminals of a voltage stabilized source of direct current 39. The resistor and capacitor 33 form a capacitor charge circuit where the capacitor progressively charges to the value of the output of voltage source 39 until bypassed by an impedance which modifies the voltage conditions of the circuit which occurs when the junction between emitter and base electrodes breaks down.

Base terminal #1 indicated by the reference numeral $4c$ is connected through a resistor 41 to the negative line 37. Base terminal #2 identified by reference numeral $4d$ is connected by a current-limiting resistor 43 to the positive line 35. The output of the oscillator circuit is obtained across the resistor 41. To this end, sudden voltage changes or pulsations appearing thereacross are coupled from the oscillator circuit by a capacitor 45 connected to the upper end of the resistor 41.

FIG. 6 illustrates the equivalent circuit for the unijunction transistor and, as shown, it includes an equivalent diode D1 whose cathode electrode is connected to the juncture of a variable base resistance RB1 and a fixed base resistance RB2. As the temperature (or pressure) to which the transistor 4 is subjected varies, the equivalent diode D1 and the base resistance RB1 vary. The point at which the diode D1 becomes conductive, therefore, varies with temperature. As the voltage across the capacitor 33 gradually increases, a point is reached where the effective back bias on the diode D1 is overcome whereupon the capacitor discharges to a voltage depending on the relation of the base resistance RB1 and resistor 41 to base resistance RB2 and resistor 43. When the voltage across the discharging capacitor reaches a given value which is below the back biasing voltage conditions existing at the time involved, the equivalent diode D1 becomes non-conductive and a new charge and discharge cycle begins. The voltage conditions appearing across the capacitor 33 for a given temperature is illustrated by the solid curve C1 in FIG. 7, the other curves C2 and C3 in FIG. 7 illustrate the voltage across capacitor 33 for temperatures above and below the temperature for curve C1. The circuit parameters are selected so that a more or less triangular waveform appears across the capacitor for the range of temperatures. As the temperature involved increases from a given temperature, the equivalent diode and base resistance conditions vary in such a way that it will take a higher voltage and thus a longer time for the transistor to break down and a longer time for the capacitor to discharge to the recovery voltage. An increase in temperature in effect, increases RB1, among other things, and decreases the frequency of the oscillator. Conversely, as the temperature decreases, RB1 decreases as does the voltage necessary to effect break down of the transistor. The discharge portion of the waveform as well as the charge portion thereof will decrease in duration to increase the oscillator frequency. A pulse appears across the resistor 41 during the time the transistor junction breaks down as shown in FIG. 7.

One of the objectives of the invention is to obtain a maximum variation in frequency with the environmental temperature to be measured. To this end, internal heating of the transistor should be minimized. There are two currents which affect the internal heating of the transistors, one of which is the current which flows through resistor 43, the base terminals 4d and 4c and resistor 41 during the intervals when the transistor is in a relatively non-conductive state. Resistors 41 and 43 are selected to minimize this current flow consistent with the requirements of the oscillator circuit. For example, when resistor 41 is adjusted above a given value, the transistor will not break down and create an effective relaxation oscillator circuit. The other current affecting the internal heating of the transistor flows when the transistor breaks down, namely the current flowing through the emitter electrode 4a, base terminal #1, and resistor 41. Here again, this current is minimized by making the resistor 41 as large as practical. It has also been discovered that maximum temperature sensitivity of the circuit is obtained when the resistor 41 is as large as possible.

The following are exemplary values for the different circuit elements shown in FIG. 5 using a General Electric 2N492 silicon transistor and an applied direct current voltage of 30 volts:

R31 _____ohms__ 100,000
R41 _____do____   1,000
R43 _____do____  47,000
C33 _____micro-farads__ 0.03

It will be noted that the current-limiting resistor 43 is many times the value of the resistor 41. The maximum value possible for resistor 41 to maintain the oscillation of the circuit is approximately 1,200 ohms. The value of 1,000 ohms, however, was selected so that the circuit was not marginal in operation. It can be said that the value of the resistor 41 should be in the neighborhood of the maximum value which would permit oscillation of the circuit.

It should be understood that the broader aspects of the invention involve the use of various types of transistors or other similar temperature or pressure responsive devices and various types of oscillator circuits. It should, therefore, be understood that numerous modifications may be made of the preferred form of the invention described above without deviating from the broader aspects thereof.

What I claim as new and desire to protect by Letters Patent of the United States is:

In a method of measuring the value of the temperature of a given environment through use of an oscillator circuit including a temperature responsive transistor device which varies the frequency of the oscillator circuit output with variation in the magnitude of the condition, and wherein the frequency-temperature curves for different transistor devices are such that there is a constant frequency difference over a first given range of temperatures including as a part thereof a second range of temperatures with which the circuit is to be used, the improvement comprising: subjecting the transistor device to a reference temperature within said first given range but beyond said second range of temperatures, then mixing the resultant output of said oscillator at the reference temperature with the output of an adjustable frequency source adjusted to provide a zero beat frequency, then placing the transistor device in the unknown temperature condition to be measured while maintaining the presence of the output of said adjustable frequency source which produced the zero beat frequency, and then measuring the difference beat frequency produced by the latter environmental condition, whereby consistent results are obtained which are independent of the particular transistor device utilized in the oscillator circuit.

References Cited by the Examiner

UNITED STATES PATENTS

| | | | |
|---|---|---|---|
| 2,322,681 | 6/43 | Zenor _____ | 73—382 |
| 2,456,811 | 12/48 | Blackburn _____ | 331—66 X |
| 2,595,092 | 4/52 | Mounce _____ | 73—382 |
| 2,696,739 | 12/54 | Endres _____ | 73—362 |
| 2,721,267 | 10/55 | Collins _____ | 73—362 X |
| 2,780,752 | 2/57 | Aldrich et al. _____ | 307—88.5 |
| 2,871,376 | 1/59 | Kretzmer. | |
| 2,890,429 | 6/59 | Baker _____ | 73—362 X |
| 3,026,485 | 3/62 | Suran _____ | 307—88.5 |

FOREIGN PATENTS 1,177,810  12/58  France.

OTHER REFERENCES

Radio-Electronics, February 1960, vol. 31, No. 2; pages 101, 106 relied upon.

ISAAC LISANN, *Primary Examiner.*